United States Patent [19]

Renshaw

[11] Patent Number: 5,782,432
[45] Date of Patent: Jul. 21, 1998

[54] APPARATUS FOR A VARIABLE AREA NOZZLE

[75] Inventor: Kevin J. Renshaw, Fort Worth, Tex.

[73] Assignee: Lockheed Corporation, Fort Worth, Tex.

[21] Appl. No.: 571,534

[22] Filed: Dec. 13, 1995

[51] Int. Cl.$^6$ .................................. B64D 33/04
[52] U.S. Cl. .................. 244/53 R; 239/265.19; 239/265.33; 239/265.37
[58] Field of Search .................. 244/215, 218, 244/23 D, 53 R; 239/265.19, 265.33, 265.37, 265.39; 60/228, 229, 230, 232

[56] References Cited

U.S. PATENT DOCUMENTS

| | | | |
|---|---|---|---|
| 2,870,602 | 1/1959 | Glenn | 239/265.39 |
| 2,934,892 | 5/1960 | Hurlbert et al. | 239/265.39 |
| 3,243,126 | 3/1966 | Kurti et al. | 239/265.39 |
| 3,391,869 | 7/1968 | Glass | 244/53 R |
| 5,406,787 | 4/1995 | Terrier | 60/204 |
| 5,476,224 | 12/1995 | Tonks | 244/23 R |

FOREIGN PATENT DOCUMENTS

| | | | |
|---|---|---|---|
| 2602274 | 2/1988 | France | 239/265.39 |
| 1284850 | 12/1968 | Germany | 244/53 R |

*Primary Examiner*—Andres Kashnikow
*Assistant Examiner*—Tien Dinh
*Attorney, Agent, or Firm*—Baker & Botts, L.L.P.

[57] ABSTRACT

A variable area exhaust nozzle 26 is provided. The variable area exhaust nozzle 26 includes a nozzle opening 30 and a plurality of nozzle flaps 38 and 40. The nozzle opening 30 has a cylindrical area and a circumference. The plurality of nozzle flaps 38 and 40 are supported about the circumference of the nozzle opening 30. The nozzle flaps 38 and 40 have an axis of rotation 52. The nozzle flaps 38 and 40 are positioned to rotate into the nozzle opening 30 to decrease the cylindrical area of the nozzle opening 30 and to rotate out of the nozzle opening 30 to increase the cylindrical area of the nozzle opening 30. The nozzle flaps 38 and 40 rotate to vary the cylindrical area of the nozzle opening 30 and to reduce the forces required to rotate the nozzle flaps 38 and 40.

18 Claims, 4 Drawing Sheets

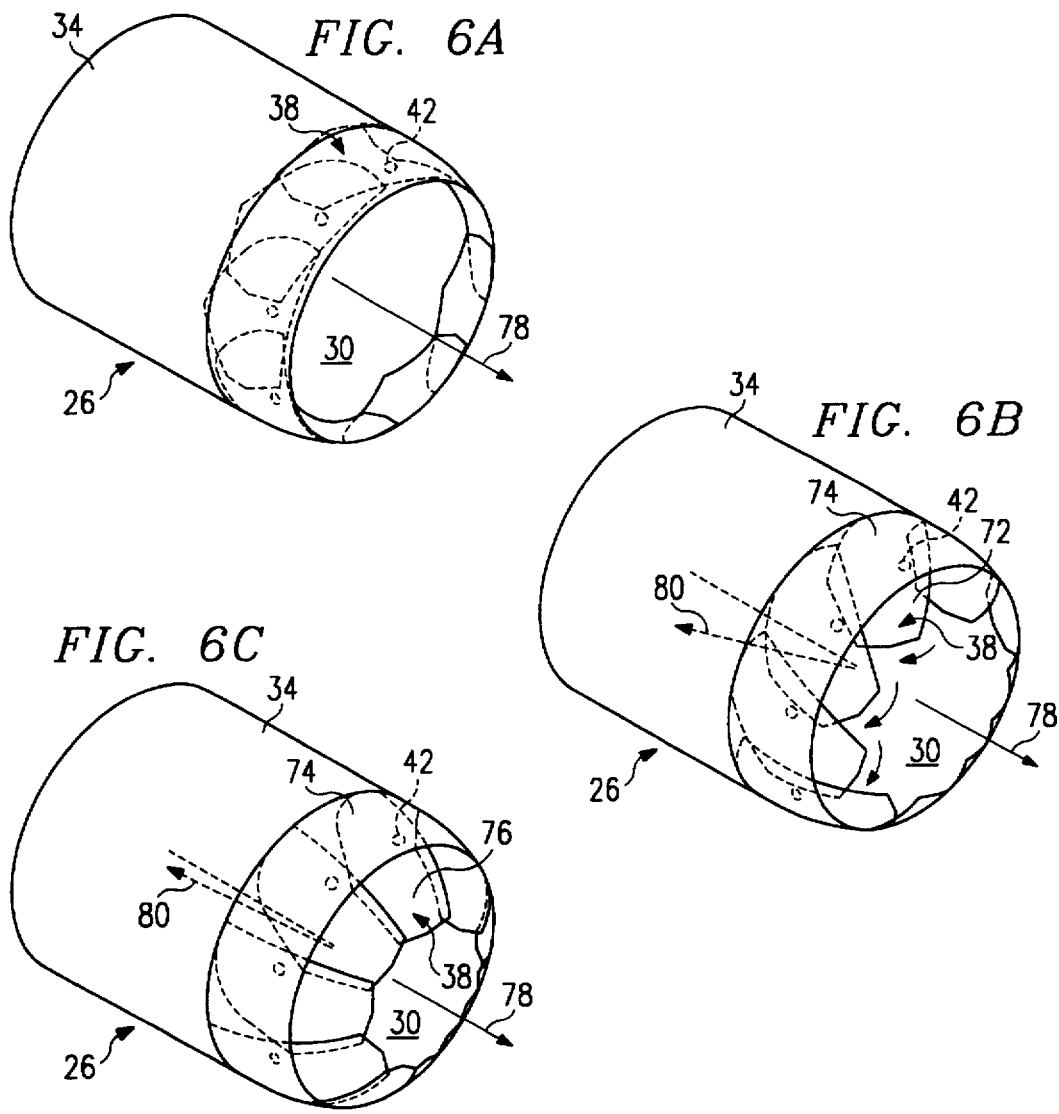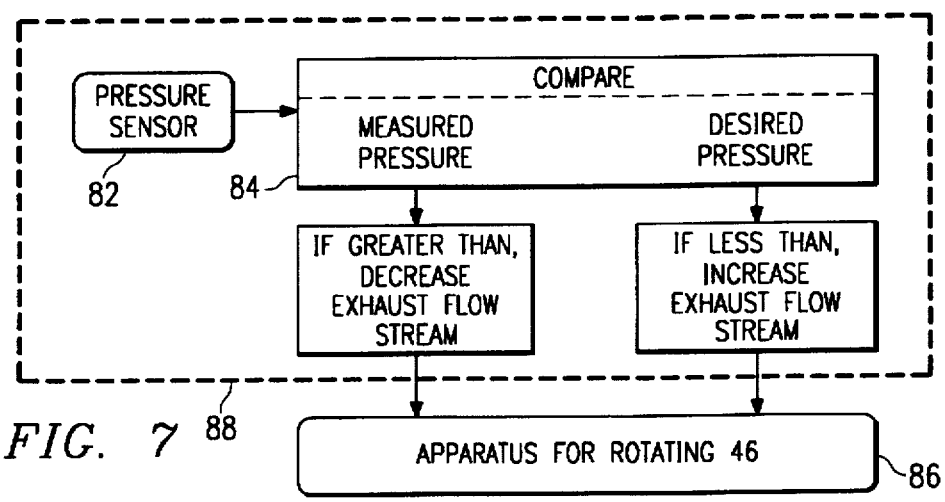

APPARATUS FOR A VARIABLE AREA NOZZLE

TECHNICAL FIELD OF THE INVENTION

This invention relates in general to the field of propulsion and more particularly to jet aircraft propulsion and an apparatus for a variable area nozzle that requires a decreased actuator load to operate the apparatus.

BACKGROUND OF THE INVENTION

In military and civilian aircraft design, it is important to maximize aircraft performance—increase speed, maximum loads, etc. To optimize the performance of a jet aircraft, it is often necessary to optimize the performance of existing aircraft components. In this vein, variable area exhaust nozzles are employed to improve the efficiency of the jet aircraft's engine.

Variable area exhaust nozzles may be used, in part, to control the speed of a jet engine. A smaller exhaust opening will cause back pressure on the engine and will slow the engine. These types of exhaust nozzles have wide applications including, but not limited to, vertical/short takeoff and landing (VSTOL) aircraft.

Conventional convergent area nozzles utilize nozzle flaps hinged along a plane around the circumference of the jet exhaust tailpipe. To reduce the cylindrical area of the nozzle, the nozzle flaps are actuated to a position in the engine exhaust flow path. To maintain this position at a fixed exhaust area, the nozzle flaps require constant actuation pressure, hydraulic or pneumatic. To provide this actuation pressure, a complete hydraulic or pneumatic system is required which increases the weight of the aircraft. Therefore, a need exists for a variable area exhaust nozzle where nozzle flap actuation requires low and relatively constant actuation forces. This would reduce the power required by the nozzle flap actuation system and would yield a lighter and simpler system than that of a conventional system.

Additionally, with this type of conventional nozzle, the exterior shape and contour slopes of the nozzle change with the change in nozzle area. As the nozzle area and engine speed/thrust is increased, the nozzle flaps are actuated to a position parallel with the engine exhaust flow path which increases the length of the nozzle. In a situation requiring maximum nozzle area and maximum engine thrust, such as vertical take-off or landing, the increased nozzle length may limit the operation of the aircraft. Therefore, a further need exists for a variable area exhaust nozzle which has a shorter length when the nozzle is at its maximum cylindrical area and the engine is at its maximum thrust. This is necessary to provide increased ground clearance for vertical take-off and landing operations.

Also, because the nozzle flaps are permanently exposed to engine exhaust flow, the nozzle flaps must be designed to withstand the additional heat and pressure of afterburner operation and may require special cooling provisions. This solution increases the cost of the flaps economically—the flaps require expensive special materials or coatings—and operationally—the flaps are heavier and increase aircraft weight. Therefore, a further need exists for a variable area exhaust nozzle where the nozzle flaps are protected from hot flow of the engine exhaust generated during afterburner operations. By retracting the nozzle flaps into a cavity in the nozzle casing, these flaps would be protected. This would allow the nozzle flaps to be built more efficiently, economically and operationally.

SUMMARY OF THE INVENTION

In accordance with the present invention, a variable area exhaust nozzle is provided that substantially eliminates or reduces disadvantages and problems associated with previously-developed conventional exhaust nozzles.

The invention provides a variable area nozzle, including a nozzle opening having a cylindrical area and a circumference and a plurality of nozzle flaps supported about the circumference of the nozzle opening. The nozzle flaps each have an axis of rotation and are positioned to rotate into the nozzle opening to decrease the cylindrical area of the nozzle opening and to rotate out of the nozzle opening to increase the cylindrical area of the nozzle opening The nozzle flaps rotate to vary the cylindrical area of the nozzle opening and to reduce the forces required to operate the nozzle flaps.

In one embodiment of the present invention, the nozzle may further include a nozzle shell having a first open end and an opposite end. The first open end of the nozzle shell is the nozzle opening. The nozzle shell includes an inner shell and an outer shell, and the inner shell and the outer shell can be positioned to define a shell cavity between the inner shell and the outer shell.

Further, the nozzle flaps can be supported on the nozzle shell so that the nozzle flaps rotate out of the shell cavity and into the nozzle opening to decrease the cylindrical area of the nozzle opening and rotate into the shell cavity and out of the nozzle opening to increase the cylindrical area of nozzle opening. The nozzle flaps rotate into the shell cavity to reduce the length of the nozzle when the cylindrical area of the nozzle shell is increased and to protect the nozzle flaps from engine exhaust flow produced during afterburner operations and the like.

Further, the nozzle can include a tailpipe having a first open end and an opposite open end and being of a substantially constant cylindrical area. The opposite end of the nozzle shell is positioned adjacent to the first open end of the tailpipe. The nozzle shell can be formed into the shape of a sphere and can be truncated so that the cylindrical area of the opposite end of the nozzle shell which is adjacent to the first open end of the tailpipe would have substantially the same cylindrical area as the tailpipe and truncated so that the nozzle opening would have a cylindrical area equal to the maximum area of the variable area nozzle.

Further, the nozzle flaps can be formed such that the shape of the nozzle flaps would conform to the spherical shape of the nozzle shell when the nozzle flaps are rotated out of the nozzle opening and into the shell cavity and when the nozzle flaps are rotated into the nozzle opening and out of the shell cavity.

Further, the axis of rotation of the nozzle flaps can be defined by a line from the center of the sphere defined by the nozzle shell to a point on each of the nozzle flaps such that when each of the nozzle flaps is rotated into the nozzle opening the force on an internal portion of the nozzle flap that remains in the shell cavity is sufficient to counteract the outward force of engine exhaust on an external portion of the nozzle flap that is extended into the engine exhaust flow and to maintain the desired cylindrical area of the nozzle opening.

Further, the plurality of nozzle flaps can include a plurality of inner nozzle flaps and a plurality of outer nozzle flaps. The inner nozzle flaps can be supported on the nozzle shell proximate the inner shell within the shell cavity. The outer nozzle flaps can be supported on the nozzle shell proximate the outer shell within the shell cavity.

Further, the nozzle can include an apparatus for rotating the nozzle flaps into the nozzle opening to decrease the cylindrical area of the nozzle opening and for rotating the nozzle flaps out of the nozzle opening to increase the cylindrical area of the nozzle opening. The apparatus for rotating the nozzle flaps can rotate the nozzle flaps simultaneously and the same distance. The apparatus for rotating the nozzle flaps can be operable to rotate the nozzle flaps to a plurality of positions including a first position where the nozzle flaps are rotated into the shell cavity and out of the nozzle shell opening and a second position where the nozzle flaps are rotated out of the shell cavity and into the nozzle shell opening.

Further, the outer shell of the nozzle shell can include a nozzle pressure casing and a nozzle fairing. The nozzle pressure casing can be supported by the nozzle shell adjacent to the tailpipe. The nozzle fairing can be supported by the nozzle shell adjacent to the nozzle pressure casing opposite the tailpipe. The nozzle fairing can be removably coupled with the nozzle pressure casing.

The present invention also provides an aircraft using the variable area nozzle. The aircraft includes an aircraft body including a plurality of wings supported on the aircraft body, an engine supported on the aircraft body, a tailpipe, and a variable area exhaust nozzle. The engine includes an exhaust end. The tailpipe has a first open end and an opposite open end. The opposite open end of the tailpipe is adjacent to the exhaust end of the engine. The tailpipe has a generally constant cylindrical area. The variable area exhaust nozzle is adjacent to the first open end of the tailpipe and includes a nozzle shell, a plurality of nozzle flaps, and an apparatus for rotating the nozzle flaps.

The nozzle shell has an opposite open end and a nozzle shell opening. The opposite open end of the nozzle shell is adjacent to the first open end of the tailpipe. The nozzle shell opening is opposite the tailpipe and has a circumference. The nozzle shell includes an inner shell and an outer shell. The inner shell and the outer shell are positioned to define a shell cavity between the inner shell and the outer shell. The nozzle shell is formed into the shape of a sphere and is truncated such that the cylindrical area of the opposite open end of the nozzle shell is substantially equal to the cylindrical area of the first open end of the tailpipe and such that the cylindrical area of the nozzle shell opening is equal to the maximum area of the variable area exhaust nozzle.

The plurality of nozzle flaps are supported the circumference of the nozzle shell opening. Each of the plurality of nozzle flaps has an axis of rotation. The nozzle flaps are supported by the nozzle shell so that the nozzle flaps can rotate into the nozzle shell opening and out of the shell cavity to decrease the cylindrical area of the nozzle shell opening and can rotate out of the nozzle shell opening and into the shell cavity to increase the cylindrical area of the nozzle shell opening. The nozzle flaps rotate into the shell cavity and out of the nozzle shell opening to reduce the length of the variable area exhaust nozzle and to protect the nozzle flaps from the engine exhaust flow produced during afterburner operations and the like. The nozzle flaps rotate into the shell cavity and out of the nozzle shell opening and rotate out of the shell cavity and into the nozzle shell opening to vary the cylindrical area of the nozzle shell opening and to reduce the forces required to operate the nozzle flaps.

The apparatus for rotating the nozzle flaps is operable to rotate the nozzle flaps into the nozzle opening and out of the shell cavity to decrease the cylindrical area of the nozzle shell opening. The apparatus for rotating the nozzle flaps is operable to rotate the nozzle flaps out of the nozzle shell opening and into the shell cavity to increase the cylindrical area of the nozzle shell opening.

In one embodiment of the present invention, the nozzle flaps can be formed so that the shape of the nozzle flaps conforms to the shape of the nozzle shell when the nozzle flaps are rotated into the nozzle shell opening and out of the shell cavity and when the nozzle flaps are rotated out of the nozzle shell opening and into the shell cavity. Further, the axis of rotation of the nozzle flaps can be defined by a line from the center of the sphere defined by the nozzle shell to a point on each of the nozzle flaps such that when each of the nozzle flaps is rotated into the nozzle shell opening the force on an internal portion of the nozzle flap that remains in the shell cavity is sufficient to counteract the outward force of engine exhaust on an external portion of the nozzle flap that is extended into the engine exhaust flow and to maintain the desired nozzle shell opening area.

Further, the plurality of nozzle flaps can include a plurality of inner nozzle flaps and a plurality of outer nozzle flaps. The inner nozzle flaps can be supported by the nozzle shell proximate the inner shell and within the shell cavity. The outer nozzle flaps can be supported by the nozzle shell proximate the outer shell and within the shell cavity.

Further, the apparatus for rotating the nozzle flaps can be operable to rotate the nozzle flaps simultaneously and the same distance. The apparatus for rotating the nozzle flaps can be operable to rotate the nozzle flaps to a plurality of positions including a first position where the nozzle flaps are rotated into the shell cavity and out of the nozzle shell opening and a second position where the nozzle flaps are rotated out of the shell cavity and into the nozzle shell opening.

Further, the outer shell of the nozzle shell can include a nozzle pressure casing and a nozzle fairing. The nozzle pressure casing can be supported by the nozzle shell adjacent to the tailpipe. The nozzle fairing can be supported by the nozzle shell adjacent to the nozzle pressure casing opposite the tailpipe. The nozzle fairing can be removably coupled with the nozzle pressure casing.

It is a technical advantage of the present invention that the rotary nature of the nozzle flap actuation mechanism yields low and relatively constant actuation forces. This yields a simpler and lighter actuation system which decreases aircraft weight significantly.

It is a further technical advantage of the present invention that at larger nozzle opening areas the nozzle flaps are retracted into the cavity of the nozzle shell, which affectively shortens the length of the nozzle. This provides increased ground clearance for vertical take-off and landing operations.

It is a further technical advantage of the present invention that by retracting the nozzle flaps into the cavity between the inner shell and outer shell of the nozzle shell, the nozzle flaps are protected from the hot flow generated during afterburner operations. This would allow the nozzle flaps to be built more efficiently, economically and operationally.

BRIEF DESCRIPTION OF THE DRAWINGS

A more complete understanding of the present invention and advantages thereof may be acquired by referring to following description taken in conjunction with the accompanying drawings in which like reference numbers indicate like features and wherein:

FIGS. 6a, 6b, and 6c illustrate perspective views of the operation of the present invention with the nozzle flaps at different operable positions; and FIG. 7 illustrates a flow diagram for a simplified variable area exhaust nozzle control system.

DETAILED DESCRIPTION OF THE INVENTION

Preferred embodiments of the present invention are illustrated in the FIGURES, like numerals being used to refer to the like and corresponding parts of the various drawings.

Figure 1:
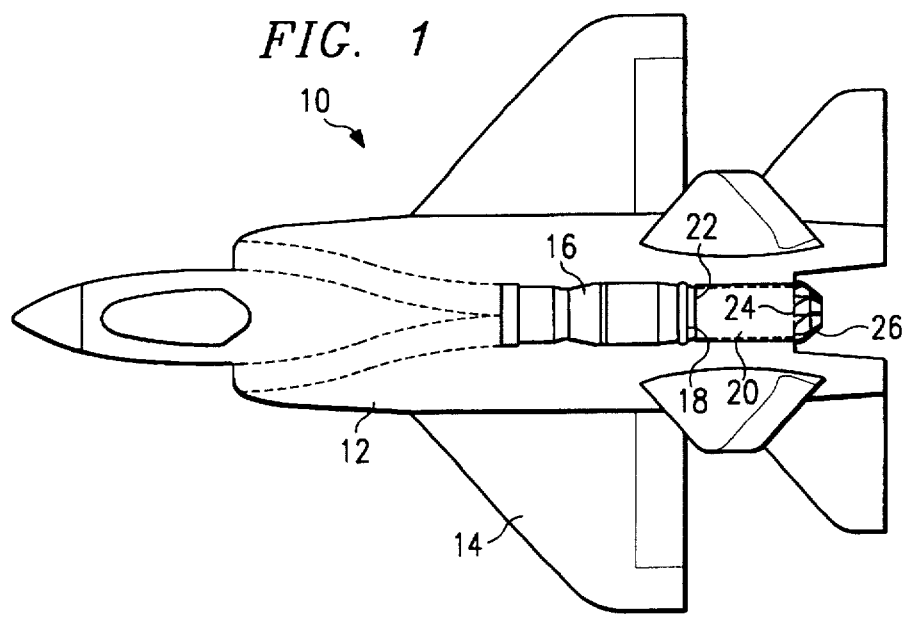
FIG. 1 illustrates a jet aircraft employing the present invention.

FIG. 1 illustrates an aircraft 10 employing the present invention, the variable area exhaust nozzle 26. In FIG. 1, the aircraft 10 includes an aircraft body 12, a plurality of wings 14 supported on the aircraft body 12, and an engine 16. The engine 16 is supported on the aircraft 10 as required by the aircraft design and includes an exhaust end 18. The exhaust end 18 of the engine 16 includes a tailpipe 20 which includes a first open end 22 and an opposite open end 24. The tailpipe 20 has a substantially constant cylindrical area. The present invention, the variable area exhaust nozzle 26 is positioned adjacent to the first open end 22 of the tailpipe 20.

Figure 2:
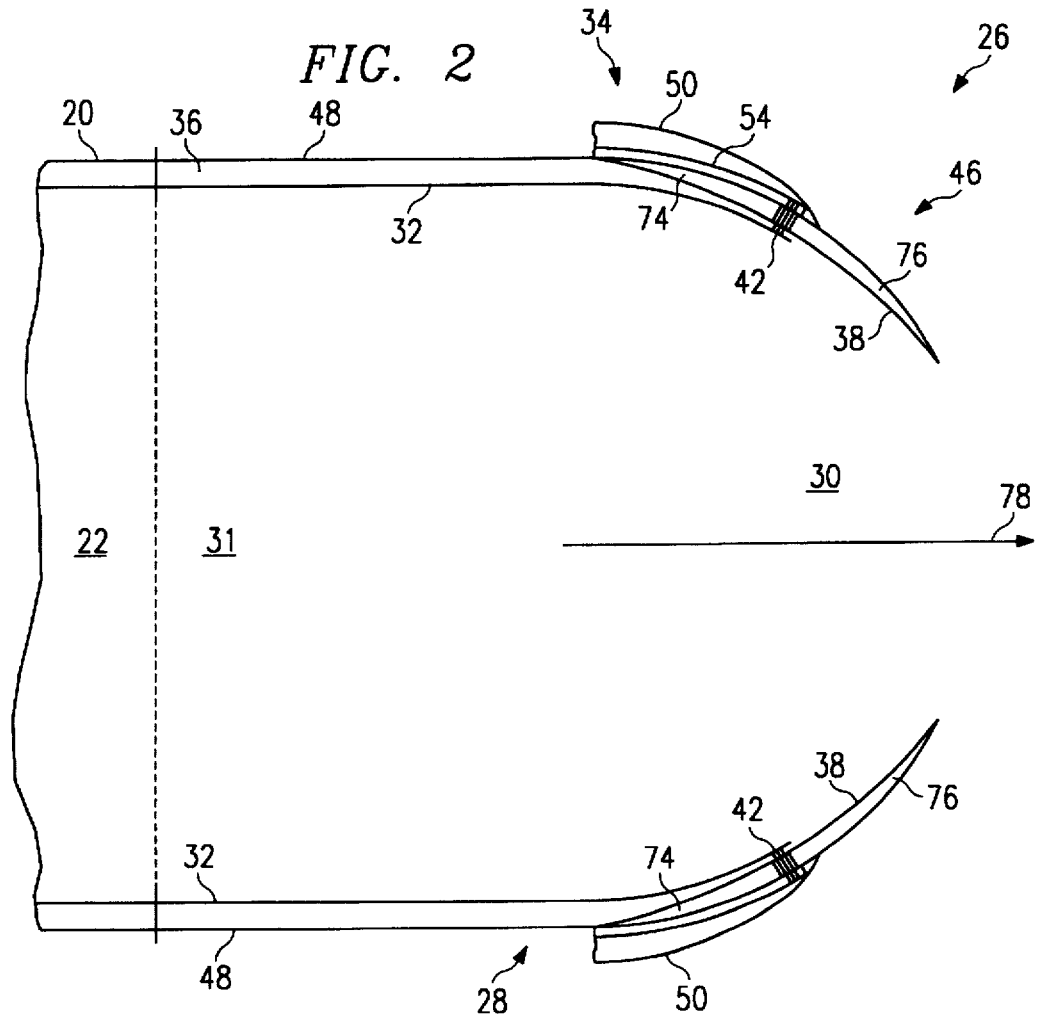
FIG. 2 is cross-sectional view of the exhaust nozzle section.

The variable area exhaust nozzle 26, as shown in FIG. 2, includes a nozzle shell 28, which is positioned adjacent to the first open end 22 of the tailpipe 20 and which is supported by the tailpipe 20. The nozzle shell 28 includes a nozzle shell opening 30 and the nozzle shell 28 further includes the inner shell 32 and the outer shell 34. The inner shell 32 and the outer shell 34 of the nozzle shell 28 are positioned to define a shell cavity 36. A plurality of inner nozzle flaps 38 and outer nozzle flaps 40 are supported on the nozzle shell 28 so that in operation the inner nozzle flaps 38 and outer nozzle flaps 40 can, by rotational movement, be extended into the nozzle shell opening 30 or retracted into the shell cavity 36 between the inner shell 32 and the outer shell 34 of the nozzle shell 28.

FIG. 2 is a cross-sectional view of the variable area exhaust nozzle 26. FIG. 2 shows the tailpipe 20, the nozzle shell 28, the inner shell 32 of the nozzle shell 28, the outer shell 34 of the nozzle shell 28, the shell cavity 36 defined between the inner shell 32 and the outer shell 34, two inner nozzle flaps 38 and corresponding inner nozzle flap hinges 42, and a portion of the apparatus for rotating the nozzle flaps 46 into extended positions and retracted positions. The corresponding outer nozzle flaps 40 and outer nozzle flap hinges 44 are not shown.

The tailpipe 20 has an first open end 22 and an opposite open end 24 adjacent to the exhaust end 18 of the engine 16 (engine not shown). The nozzle shell 28 has an open end, the nozzle shell opening 30 and an opposite open end 31. The nozzle shell is positioned with the opposite open end 31 adjacent to the first open end 22 of the tailpipe 20. The nozzle shell opening 30 is positioned opposite the tailpipe 20. The inner shell 32 of the nozzle shell 28, also known as the nozzle cooling liner, forms the interior portion of the nozzle shell 28. The outer shell 34 of the nozzle shell includes the nozzle pressure casing 48 and the nozzle fairing 50. The outer shell 34 forms the exterior portion of the nozzle shell 28 and surrounds the inner shell 32. The nozzle fairing 50 forms a portion of the outer shell 34 of the nozzle shell 28 and is positioned to overlap the nozzle shell opening 30.

The inner nozzle flaps 38 are shown supported on the nozzle shell 28 by corresponding inner nozzle flap hinges 42. The inner nozzle flap hinges 42 are aligned along the nozzle flap axis 52 (defined below). The inner nozzle flaps 38 are supported on the inner nozzle flap hinges 42 so that the inner nozzle flaps 38 can, by rotational movement, extend into the nozzle shell opening 30 or retract into the shell cavity 36 between the inner shell 32 and outer shell 34 of the nozzle shell 28. The pivot arm drive 54 is a portion of the apparatus for rotating the nozzle flaps 46 into extended positions or retracted positions.

Figure 3:
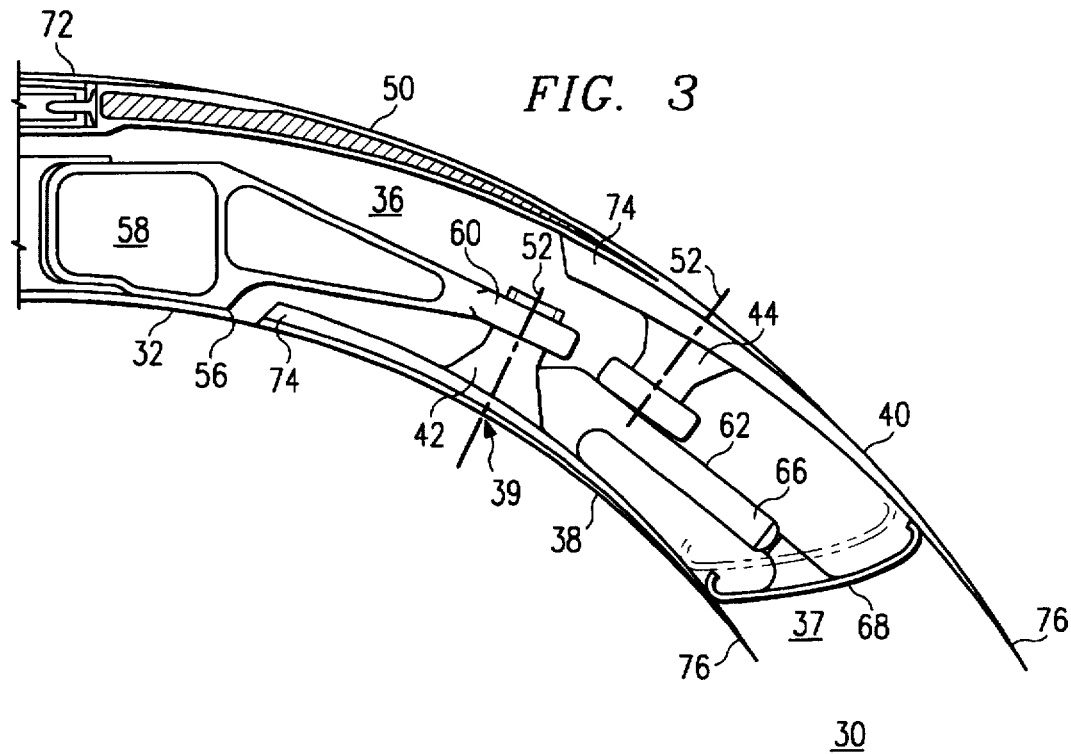
FIG. 3 is a partial, enlarged cross-sectional view of the exhaust nozzle section with the nozzle flaps shown in a closed position.

FIG. 3 is a partial, enlarged cross-sectional view of the variable area exhaust nozzle 26 in the closed position and shows the invention 26 in greater detail. In FIG. 3, the inner nozzle flaps 38 and outer nozzle flaps 40 are shown rotated into the extended position so that the area of the nozzle shell opening 30 is at its minimum.

The inner shell 32 of the nozzle shell 28, also known as the fixed inner liners supports one end 58 of the nozzle flap support fittings 56 which are positioned in the shell cavity 36. The nozzle flap support fitting 56 extends within the shell cavity 36 toward the shell cavity opening 37 and toward the nozzle shell opening 30. The inner nozzle flap hinge 42, aligned with the nozzle flap axis 52, is supported proximate the opposite end 60 of the nozzle flap support fitting 56 which is nearest the nozzle shell opening 30 and shell cavity opening 37. The inner nozzle flap 38 is supported by the inner nozzle flap hinge 42 so that the inner nozzle flap 38 is aligned with the inner shell 32 of the nozzle shell 28. The outer nozzle flap 40 is supported by the nozzle flap support fitting 56. The outer nozzle flap hinge 44 is supported on that nozzle flap support fitting 56 and is aligned with the nozzle flap axis 52. The outer nozzle flap 40 is supported on the outer nozzle flap hinge 44 so that the outer nozzle flap 40 is aligned with the inner nozzle flap 38 and the outer shell 34 of the nozzle shell 28.

One end 64 of the divergent section ring drive arm 62 is integral to the inner nozzle flap 38 proximate the nozzle flap axis 52. The divergent section ring drive arm 62 extends from the inner nozzle flap hinge 42 toward the nozzle shell opening 30 and shell cavity opening 37 within the shell cavity 36. The divergent section ring 68 is supported proximate the opposite end 66 of the divergent section ring drive arm 62 nearest to the nozzle shell opening 30 and shell cavity opening 37. The divergent section ring 68 is concave shaped with the concave side 70 facing into the shell cavity 36 and away from the nozzle shell opening 30 and shell cavity opening 37. The divergent section ring 68 extends from the inner nozzle flap 38 to the outer nozzle flap 40.

A fuselage nozzle closeout 72 is located on the tailpipe 20. The fuselage nozzle closeout 72 extends around the circumference of the first open end 22 of the tailpipe 20. A portion of the outer shell 34 of the nozzle shell 28, the nozzle fairing 50 removes and couples to the fuselage nozzle closeout 72.

Figure 4:
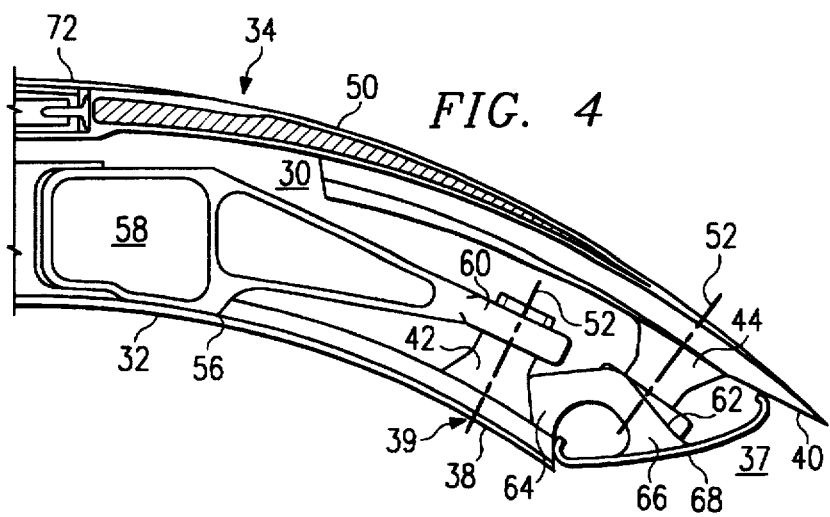
FIG. 4 is a partial, enlarged cross-sectional view of the exhaust nozzle section with the nozzle flaps shown in an open position.

FIG. 4 is a partial enlarged cross-sectional view of the variable area exhaust nozzle 26 in the open position and shows the invention 26 in greater detail. FIG. 4 shows the components described above in the description of FIG. 3. In FIG. 4, the inner nozzle flaps 38 and outer nozzle flaps 40 have been rotated into the retracted position so that the nozzle shell opening 30 is at its maximum area. With the inner nozzle flaps 38 and outer nozzle flaps 40 in this retracted position, the divergent section ring 68 has also retracted a distance so that it now extends from the retracted inner nozzle flap 38 to the retracted outer nozzle flap 40 across the shell cavity opening 37.

Figure 5A:
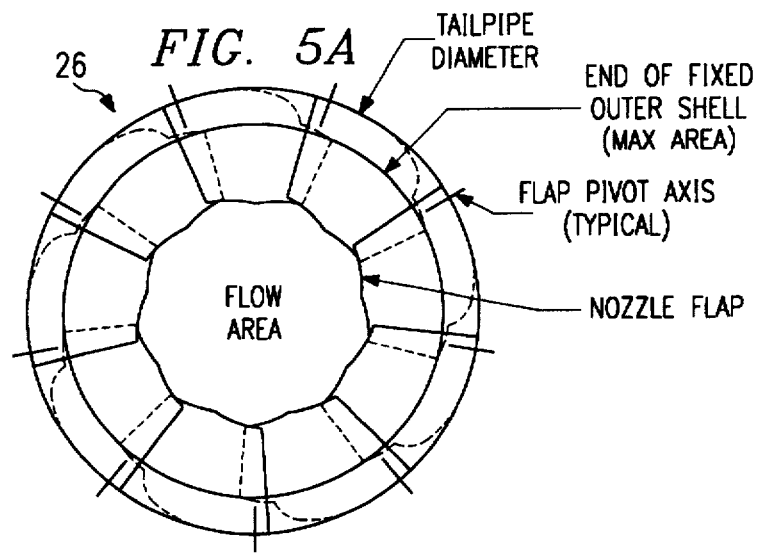
FIGS. 5a, 5b and 5c are enlarged frontal views of the exhaust nozzle section with the nozzle flaps shown in different operating positions.
Figure 5B:
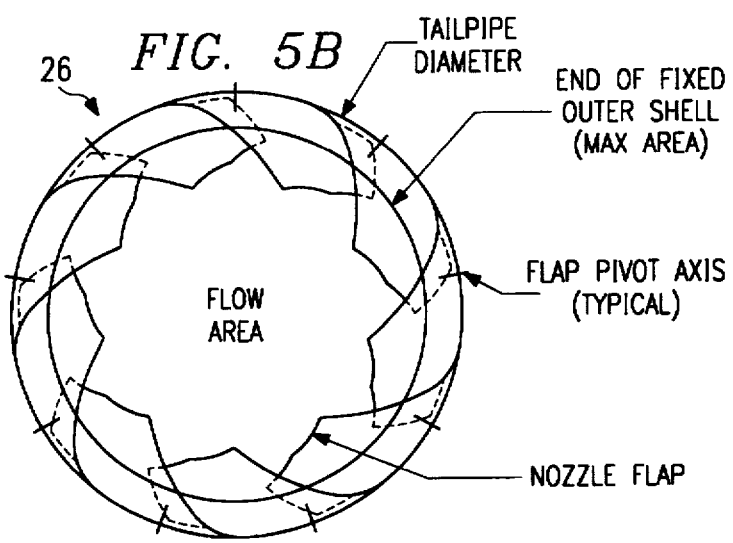
Figure 5C:
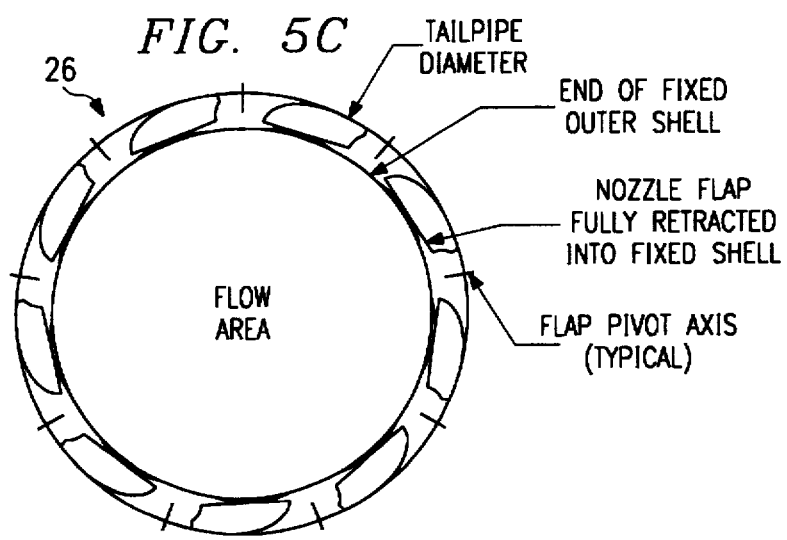

FIGS. 5a, 5b, and 5c show enlarged frontal views of the variable area exhaust nozzle 26 in greater detail with the components described in FIGS. 3 and 4. FIG. 5a illustrates the variable area exhaust nozzle 26 in the "closed" positioned resulting in a minimum flow area through the nozzle 26. FIG. 5b illustrates the nozzle 26 in an intermediate position. FIG. 5c illustrates the variable area exhaust nozzle 26 in the "open" position that creates a maximum flow area through the nozzle 26.

The concepts embodied in the variable area exhaust nozzle 26 can be adapted to control flow from various types machines, including, but not limited to jet engines, and to machines of various dimensions. The present invention 26 has been developed for use with the next generation of advanced strike aircraft and the like. The variable area exhaust nozzle 26 can, however, be adapted for use with existing aircraft such as the F-16. The general requirements of the invention 26 are described in use with a typical jet engine, the F-100.

The nozzle shell 28 is formed into the shape of a sphere. The nozzle shell 28 is truncated so that the opposite open end 31 of the nozzle shell 8 that is adjacent to the tailpipe 20 is of a substantially equal cylindrical area to the cylindrical area of the tailpipe 20. The open end of the nozzle shell 28, the nozzle shell opening 30, would be truncated to have a cylindrical area equal to the maximum cylindrical area of the variable cylindrical area exhaust nozzle 26.

Similarly, the inner shell 32 and the outer shell 34 of the nozzle shell 28 are formed to conform to the spherical shape described above. However, the inner shell 32 and the outer shell 34 are positioned to define a shell cavity 36 that is of sufficient size to accommodate the retracted inner nozzle flaps 38, retracted outer nozzle flaps 40, the apparatus for rotating the nozzle flaps 46, the nozzle flap support fittings 56, the inner nozzle flap hinges 42, and the outer nozzle flap hinges 44 completely. The inner shell 32 and the outer shell 34 are formed out of material and constructed in a manner known in the art with the above requirements.

Each inner nozzle flap 38 and each outer nozzle flap 40 are constructed to conform to the spherical shape of the nozzle shell 28 when the inner nozzle flaps 38 and the outer nozzle flaps 40 are extended and retracted. The inner nozzle flaps 38 overlap each other when the inner nozzle flaps 38 are extended. The outer nozzle flaps 40 overlap each other when the outer nozzle flaps 40 are extended. The dimensions and number of the inner nozzle flaps 38 and the outer nozzle flaps 40 are related to the dimensions of the variable area exhaust nozzle 26. Each inner nozzle flap 38 and outer nozzle flap 40 is constructed of material known in the art and, internally, may be constructed in a manner known in the art so that the inner nozzle flaps 38 and the outer nozzle flaps 40 conform to the requirements of the invention 26.

For rotational movement of the inner nozzle flaps 38 and the outer nozzle flaps 40, a nozzle flap axis 52 is defined for each inner nozzle flap 38 and each outer nozzle flap 40. The requirements for the nozzle flap axis 52 are the same for inner nozzle flaps 38 and outer nozzle flaps 40. The nozzle flap axis 52 is the line from the center of the sphere 29 defined by the nozzle shell 28 to a point 39 on each nozzle flap (inner 38 or outer 40) defined by the requirement that when the nozzle flap (inner 38 or outer 40) is rotated to extended positions the force on the internal portion 74 of the nozzle flap (inner 38 or outer 40) that remains in the shell cavity 36 is sufficient to counteract the outward force of engine exhaust on the external portion 76 of the nozzle flap (inner 38 or outer 40) that is extended into the engine exhaust flow and to maintain the desired nozzle shell opening 30 area. When operated as discussed below, each nozzle flap (inner 38 or outer 40) rotates on its nozzle flap hinge (inner 42 or outer 44) about its defined nozzle flap axis 52.

The apparatus for rotating the nozzle flaps 46 into extended positions and retracted positions may be any type of mechanical apparatus that extends and retracts the nozzle flaps (inner 38 and outer 40) as required, including, but not limited to hydraulic or pneumatic apparatus. The apparatus for rotating the nozzle flaps 46 operates the inner nozzle flaps 38 and the outer nozzle flaps 40 simultaneously. The apparatus for rotating the nozzle flaps 46 responds to an operator command or automated command (not shown). Based on the command received by the apparatus for rotating the nozzle flaps 46, the apparatus for rotating the nozzle flaps 46 rotates the inner nozzle flaps 38 and the outer nozzle flaps 40. The command may be transmitted by methods or mechanisms known in the art.

FIGS. 6a, 6b, and 6c illustrate the present invention 26 in various operable positions. FIG. 6a illustrates the inner nozzle flaps 38 and outer nozzle flaps 40 rotated to a retracted position so that the nozzle shell opening 30 has a larger cylindrical area and the inner nozzle flaps 38 and the outer nozzle flaps 40 have been retracted into the shell cavity 36 between the inner shell 32 and outer shell 34 of the nozzle shell 28. FIG. 6c illustrates the inner nozzle flaps 38 and the outer nozzle flaps 40 rotated to an extended position, in which the inner nozzle flaps 38 and the outer nozzle flaps 40 are extended into the nozzle shell opening so 30 that the nozzle shell opening 30 has a smaller cylindrical area. FIG. 6b illustrates the inner nozzle flaps 38 and the outer nozzle flaps 40 rotated to a partly extended position, in which the nozzle shell opening 30 has a cylindrical area which is between its minimum area and its maximum area.

In operation, the engine (not shown) provides an exhaust flow stream 78 (depicted by the directional arrow). With the inner nozzle flaps 38 and the outer nozzle flaps 40 in the fully retracted position and the variable area exhaust nozzle 26 in the open position, as shown in FIG. 6a, the engine exhaust flow stream 78 proceeds through the tailpipe 20, through the variable area exhaust nozzle 26, and is expelled through the nozzle shell opening 30 providing maximum thrust.

To operate the variable area exhaust nozzle 26 to this position, the operator or automated means would select this position from the controller not shown). The apparatus for rotating the nozzle flaps 46 would respond to the controller command or signal from the operator selection or automated selection through mechanical methods or mechanisms. The inner nozzle flaps 38 and the outer nozzle flaps 40 would be simultaneously rotated by the apparatus for rotating the nozzle flaps 46. Each inner nozzle flap 38 and each outer nozzle flap 40 would rotate until fully retracted out of the nozzle shell opening 30 and into the shell cavity 36. The nozzle shell opening 30 and variable area exhaust nozzle 26 would be at their maximum area. No additional back pressure would be applied to the engine.

With the inner nozzle flaps 38 and the outer nozzle flaps 40 in the fully extended position and the variable area exhaust nozzle 26 in the closed position, as shown in FIG. 6c, the engine exhaust flow stream 78 proceeds through the tailpipe 20 and into the variable area exhaust nozzle 26. A diverted portion 80 of the engine exhaust flow stream 78 is diverted by the inner nozzle flaps 38 and applies additional back pressure on the engine (not shown). The back pressure acts to slow the engine.

To operate the variable area exhaust nozzle 26 to this position, the operator or automated means would select this position from the controller (not shown). The apparatus for rotating the nozzle flaps 46 would respond to the controller or signal from the operator selection or automated selection through mechanical methods or mechanisms. The inner nozzle flaps 38 and the outer nozzle flaps 40 would be simultaneously rotated by the apparatus for rotating the nozzle flaps 46. Each inner nozzle flap 38 and each outer nozzle flap 40 would rotate until an external portion 76 of the nozzle flap (inner 38 and outer 40) is fully extended into the nozzle shell opening 30. A corresponding internal portion 74 of the nozzle flap (inner 38 and outer 40) is positioned in the shell cavity 36 and counteracts the forces applied by the engine exhaust flow stream 78 to maintain the nozzle flap (inner 38 and outer 40) in position The nozzle shell opening 30 and variable area exhaust nozzle 26 would be at their minimum area. Additional back pressure would be applied to the engine (not shown), slowing it.

If the variable area exhaust nozzle 26 is designed for more than two positions, open and closed, the variable area exhaust nozzle 26 may be operated to middle positions. With the inner nozzle flaps 38 and the outer nozzle flaps 40 in an extended position and the variable area exhaust nozzle 26 in a middle position, as shown in FIG. 6b, the engine exhaust flow stream 78 proceeds through the tailpipe 20 and into the variable area exhaust nozzle 26. A diverted portion 80 of the engine exhaust flow stream 78 is diverted by the inner nozzle flaps 38 and applies additional back pressure on the engine (not shown). The back pressure acts to slow the engine.

To operate the variable area exhaust nozzle 26 to a middle position, the operator or automated means would select this position from the controller (not shown). The apparatus for rotating the nozzle flaps 46 would respond to the controller command or signal from the operator selection or automated selection through mechanical methods or mechanisms. The inner nozzle flaps 38 and the outer nozzle flaps 40 would be simultaneously rotated by the apparatus for rotating the nozzle flaps 46. Each inner nozzle flap 38 and each outer nozzle flap 40 would rotate until an external portion 76 of the nozzle flap (inner 38 and outer 40) is extended into the nozzle shell opening 30. The inner nozzle flap 38 and the outer nozzle flap 40 would be rotated to a position corresponding to the operator selection or automated selection made. A corresponding internal portion 74 of the nozzle flap (inner 38 and outer 40) is positioned in the shell cavity 36 and counteracts the forces applied by the engine exhaust flow stream 78 to maintain the nozzle flap (inner 38 and outer 40) in position. The nozzle shell opening 30 and variable area exhaust nozzle 26 would be at an area between the maximum and minimum. Additional back pressure would be applied to the engine (not shown), slowing it.

The number of positions for the inner nozzle flaps 38 and the outer nozzle flaps 40 and for the variable area exhaust nozzle 26 is a design consideration. The inner nozzle flaps 38 and the outer nozzle flaps 40 could have as few as two positions, extended and retracted. Correspondingly, the variable area exhaust nozzle 26 could have as few as two positions, open and closed. The invention 26 could have as many positions as required based on the range of motion of the inner nozzle flaps and the outer nozzle flaps 40 and the specificity of the apparatus for rotating the nozzle flaps 46. In the present invention, a preferred embodiment used numerous positions for the variable area exhaust nozzle 26, including an open position, a closed position, and several middle positions.

FIG. 7 illustrates a flow diagram for a simplified variable area exhaust nozzle control system. The function of the controller is to maintain the variable area exhaust nozzle 26 in the desired operable position. In step 82, a sensor is used to monitor the pressure of the engine exhaust flow stream 78 in the variable area exhaust nozzle 26. In step 84, the measured pressure is compared to the desired pressure which is selected by the operator or automated means (not shown). If the measured pressure is different from the desired pressure, the controller will, in step 86, command the apparatus for rotating the nozzle flaps 46 to rotate the nozzle flaps (inner 38 and outer 40) so that the measured pressure equals the desired pressure.

Although the present invention has been described in detail, it should be understood that various changes, substitutions, and alterations may be made hereto without departing from the spirit and scope of the invention as defined by the appended claims.

What is claimed is:

1. A variable area nozzle, the nozzle comprising:

a nozzle shell forming a nozzle opening the nozzle opening having a cylindrical area and a circumference; and a plurality of inner and outer nozzle flaps, each nozzle flap having an internal portion and an external portion, said nozzle flaps supported about said circumference of said nozzle opening with said internal portion, said nozzle flaps each having an axis of rotation, said nozzle flaps positioned to rotate said external portion into said nozzle opening to decrease said cylindrical area of said nozzle opening, said nozzle flaps positioned to rotate out of said nozzle opening to increase said cylindrical area of said nozzle opening, and said rotation of said nozzle flaps to vary said cylindrical area of said nozzle opening and to reduce the forces required to rotate said nozzle flaps.

2. A nozzle as set forth in claim 1, wherein said nozzle shell comprises an inner shell and an outer shell, said nozzle shell having a first open end and an opposite end, said first open end of said nozzle shell being said nozzle opening, and said inner shell and said outer shell are positioned to define a shell cavity between said inner shell and said outer shell.

3. A nozzle as set forth in claim 2, said nozzle flaps supported by said nozzle shell so that said nozzle flaps rotate out of said shell cavity and into said nozzle opening to decrease said cylindrical area of said nozzle opening, said nozzle flaps are supported by said nozzle shell so that said nozzle flaps rotate into said shell cavity and out of said nozzle shell opening to increase said cylindrical area of said nozzle shell opening, said rotation of said nozzle flaps into said shell cavity to reduce the length of the nozzle when said cylindrical area of said nozzle opening is increased, and said rotation of said nozzle flaps into said shell cavity to protect said nozzle flaps from engine exhaust flow produced during afterburner operations and the like.

4. The nozzle as set forth in claim 2, the nozzle further comprising:

a tailpipe having a first open end and an opposite open end, said tailpipe having a substantially constant cylin-

11 drical area, said opposite end of said nozzle shell positioned adjacent to said first open end of said tailpipe, said nozzle shell formed in the shape of a sphere, and said nozzle shell truncated such that the cylindrical area of said opposite open end of said nozzle shell is substantially equal to said substantially constant cylindrical area of said tailpipe and such that said nozzle shell opening is equal to the maximum cylindrical area of the variable area nozzle.

5. A nozzle as set forth in claim 4, said nozzle flaps formed such that the shape of said nozzle flaps conforms to said shape of said nozzle shell when said nozzle flaps are rotated out of said nozzle opening and into said shell cavity and when said nozzle flaps are rotated into said nozzle opening and out of said shell cavity.

6. A nozzle as set forth in claim 5, said plurality of nozzle flaps including a plurality of inner nozzle flaps and a plurality of outer nozzle flaps, said inner nozzle flaps supported on said nozzle shell within said shell cavity and proximate said inner shell, and said outer nozzle flaps supported on said nozzle shell within said shell cavity and proximate said outer shell.

7. A nozzle as set forth in claim 1, said axis of rotation of said nozzle flaps defined by a line from the center of the said sphere defined by said nozzle shell a point on each of said nozzle flaps such that when each of said nozzle flaps is rotated into the nozzle opening the force on an internal portion of said nozzle flap that remains in said shell cavity is sufficient to counteract the outward force of engine exhaust on an external portion of said nozzle flap that is extended into the engine exhaust flow and to maintain the desired cylindrical area of said nozzle shell opening.

8. A nozzle as set forth in claim 1, the nozzle further comprising:
 an apparatus for rotating the nozzle flaps operable to rotate said nozzle flaps into said nozzle opening and out of said shell cavity to decrease said cylindrical area of said nozzle opening, and said apparatus for rotating the nozzle flaps operable to rotate said nozzle flaps out of said nozzle opening and into said shell cavity to increase said cylindrical area of said nozzle shell opening.

9. A nozzle as set forth in claim 8, said apparatus for rotating the nozzle flaps is operable to rotate said plurality of nozzle flaps so that each of said nozzle flaps rotates simultaneously and the same distance.

10. A nozzle as set forth in claim 9, said apparatus for rotating the nozzle flaps operable to rotate said nozzle flaps to a plurality of positions including a first position where said nozzle flaps are rotated into said shell cavity and out of said nozzle shell opening and a second position where said nozzle flaps are rotated out of said shell cavity and into said nozzle shell opening.

11. A nozzle as set forth in claim 5, said outer shell of said nozzle shell including a nozzle pressure casing and a nozzle fairing, said nozzle pressure casing positioned adjacent to said tailpipe, said nozzle fairing supported by said nozzle pressure casing opposite said tailpipe, and said nozzle fairing overlapping said nozzle shell opening.

12. A nozzle as set forth in claim 11, said nozzle fairing removably coupled with said nozzle pressure casing.

13. An aircraft, the aircraft comprising:
 an aircraft body, said aircraft body including a plurality of wings supported on the aircraft body;
 an engine supported on said aircraft body, said engine including an exhaust end;
 a tailpipe, said tailpipe having a first open end and an opposite open end, said opposite open end of said tailpipe being adjacent to said exhaust end of said engine, and said tailpipe having a generally constant cylindrical area;
 a variable area exhaust nozzle, said variable area exhaust nozzle being adjacent to said first open end of said tailpipe, and said variable area exhaust nozzle including:
  a nozzle shell, said nozzle shell having a first open end and an opposite open end, said opposite open end of said nozzle shell positioned adjacent to said first open end of said tailpipe, said first open end of said nozzle shell being the nozzle shell opening, said nozzle shell opening being positioned opposite said tailpipe, said nozzle shell including an inner shell and an outer shell, and said inner shell and said outer shell positioned to define a shell cavity, said nozzle shell formed in the shape of a sphere, and said nozzle shell truncated such that the cylindrical area of said first open end of said nozzle shell is substantially equal to said constant cylindrical area of said engine tailpipe and such that said nozzle shell opening is equal to the maximum cylindrical area of the variable area nozzle;
  a plurality of inner and outer nozzle flaps, each nozzle flap having an internal portion and an external portion, said nozzle flaps supported about said circumference of said nozzle opening with said internal portion, said nozzle flaps each having an axis of rotation, said nozzle flaps supported by said nozzle shell so that said nozzle flaps rotate out of said shell cavity and into said nozzle opening to decrease said cylindrical area of said nozzle opening, said nozzle flaps are supported by said nozzle shell so that said nozzle flaps rotate into said shell cavity and out of said nozzle shell opening to increase said cylindrical area of said nozzle shell opening, said rotation of said nozzle flaps into said shell cavity to reduce the length of the nozzle when said cylindrical area of said nozzle opening is increased, said rotation of said nozzle flaps into said shell cavity to protect said nozzle flaps from engine exhaust flow produced during afterburner operations and the like, said rotation of said nozzle flaps to vary the cylindrical area of said nozzle opening, and said rotation of said nozzle flaps to reduce the forces required to rotate said nozzle flaps; and
  an apparatus for rotating said nozzle flaps operable to rotate said nozzle flaps into said nozzle opening and out of said shell cavity to decrease the cylindrical area of said nozzle opening, and said apparatus for rotating the nozzle flaps operable to rotate said nozzle flaps out of said nozzle opening and into said shell cavity to increase the cylindrical area of said nozzle shell opening.

14. An aircraft as set forth in claim 13, said nozzle flaps formed such that the shape of said nozzle flaps conforms to said shape of said nozzle shell when said nozzle flaps are rotated out of said nozzle opening and into said shell cavity and when said nozzle flaps are rotated into said nozzle opening and out of said shell cavity, and said axis of rotation of said nozzle flaps defined by a line from the center of the said sphere defined by said nozzle shell a point on each of said nozzle flaps such that when each of said nozzle flaps is rotated into the nozzle opening the force on an internal portion of said nozzle flap that remains in said shell cavity is sufficient to counteract the outward force of engine exhaust on an external portion of said nozzle flap that is extended into the engine exhaust flow and to maintain the desired cylindrical area of said nozzle shell opening.

15. An aircraft as set forth in claim 13, said apparatus for rotating said nozzle flaps operable to rotate said plurality of nozzle flaps so that each of said nozzle flaps rotates simultaneously and the same distance, and said apparatus for rotating the nozzle flaps operable to rotate said nozzle flaps to a plurality of positions including a first position where said nozzle flaps are rotated into said shell cavity and out of said nozzle shell opening and a second position where said nozzle flaps are rotated out of said shell cavity and into said nozzle shell opening.

16. An aircraft as set forth in claim 14, said plurality of nozzle flaps including a plurality of inner nozzle flaps and a plurality of outer nozzle flaps, said inner nozzle flaps supported on said nozzle shell within said shell cavity and proximate said inner shell, and said outer nozzle flaps supported on said nozzle shell within said shell cavity and proximate said outer shell.

17. An aircraft as set forth in claim 13, said outer shell of said nozzle shell including a nozzle pressure casing and a nozzle fairing, said nozzle pressure casing positioned adjacent to said tailpipe, said nozzle fairing supported by said nozzle pressure casing opposite said tailpipe, said nozzle fairing overlapping said nozzle shell opening, and said nozzle fairing removably coupled with said nozzle pressure casing.

18. A variable area nozzle for changing the area of an exhaust opening of a tailpipe of a jet engine, the nozzle comprising:

a nozzle shell associated with the tailpipe, the nozzle shell having an inner shell and an outer shell, the inner shell and outer shell forming a shell cavity;

a plurality of inner nozzle flaps rotationally supported in the shell cavity, each inner nozzle flap having an axis of rotation positioned to rotate the inner nozzle flap from the shell cavity into the exhaust opening; and a plurality of outer nozzle flaps rotationally supported in the shell cavity, each outer nozzle flap having an axis of rotation positioned to rotate the outer nozzle flap from the shell cavity into the exhaust opening.

\* \* \* \* \*